United States Patent
Jeon et al.

(10) Patent No.: US 11,468,257 B2
(45) Date of Patent: Oct. 11, 2022

(54) ELECTRONIC APPARATUS FOR RECOGNIZING MULTIMEDIA SIGNAL AND OPERATING METHOD OF THE SAME

(71) Applicant: NAVER CORPORATION, Gyeonggi-do (KR)

(72) Inventors: Jisu Jeon, Seongnam-si (KR); Dong Hwan Kim, Seongnam-si (KR); Dong Woo Suh, Seongnam-si (KR); Dae Hwang Kim, Seongnam-si (KR); Jongeun Park, Seongnam-si (KR)

(73) Assignee: NAVER CORPORATION, Seongnam-Si (KR)

( * ) Notice: Subject to any disclaimer, the term of this patent is extended or adjusted under 35 U.S.C. 154(b) by 102 days.

(21) Appl. No.: 16/898,837

(22) Filed: Jun. 11, 2020

(65) Prior Publication Data
US 2020/0394383 A1 Dec. 17, 2020

(30) Foreign Application Priority Data
Jun. 13, 2019 (KR) .................. 10-2019-0070097

(51) Int. Cl.
*G06K 9/00* (2022.01)
*G06F 16/41* (2019.01)

(52) U.S. Cl.
CPC ........... *G06K 9/0055* (2013.01); *G06F 16/41* (2019.01); *G06K 9/0051* (2013.01); *G06K 9/00523* (2013.01)

(58) Field of Classification Search
None
See application file for complete search history.

(56) References Cited

U.S. PATENT DOCUMENTS

| | | | |
|---|---|---|---|
| 7,921,296 B2* | 4/2011 | Haitsma | G10H 1/0058 713/168 |
| 8,965,859 B1* | 2/2015 | Ioffe | G06F 16/41 707/698 |
| 9,786,298 B1* | 10/2017 | Greene | G06F 16/683 |
| 10,860,647 B2* | 12/2020 | Scott | G06F 16/9014 |
| 11,132,555 B2* | 9/2021 | Xu | G06V 10/751 |
| 2002/0178410 A1* | 11/2002 | Haitsma | H04N 19/467 714/709 |

(Continued)

FOREIGN PATENT DOCUMENTS

| | | | | |
|---|---|---|---|---|
| CN | 1754218 A | 3/2006 | | |
| EP | 1362485 A1 * | 11/2003 | ........... | G06F 16/683 |

(Continued)

OTHER PUBLICATIONS

Office Action dated Jul. 13, 2021 issued in corresponding Japanese Patent Application No. 2020-095392.

(Continued)

*Primary Examiner* — Anand P Bhatnagar
(74) *Attorney, Agent, or Firm* — Harness, Dickey & Pierce, P.L.C.

(57) ABSTRACT

Disclosed are an electronic apparatus for recognizing a multimedia signal and an operating method of the electronic apparatus, including segmenting a detection signal into a plurality of frames; segmenting each of the frames into a plurality of blocks; and representing each of the blocks as a hash word based on a time feature and a frequency feature for each of the blocks.

18 Claims, 22 Drawing Sheets

(56) References Cited

U.S. PATENT DOCUMENTS

| | | | |
|---|---|---|---|
| 2005/0143973 A1 | 6/2005 | Taniguchi et al. | |
| 2008/0075303 A1 | 3/2008 | Kim et al. | |
| 2013/0279592 A1* | 10/2013 | Metoevi | H04N 19/139 375/240.16 |
| 2019/0027155 A1 | 1/2019 | Liu et al. | |
| 2019/0080177 A1* | 3/2019 | Xu | G06F 16/735 |
| 2021/0382932 A1* | 12/2021 | Stojancic | G06F 16/9014 |

FOREIGN PATENT DOCUMENTS

| | | | | |
|---|---|---|---|---|
| JP | 2009-036862 A | 2/2009 | | |
| JP | 2015-515646 A | 5/2015 | | |
| JP | 2017-518715 A | 7/2017 | | |
| JP | 6619542 B1 | 12/2019 | | |
| JP | 2020-533920 A | 11/2020 | | |
| KR | 10-2009-0002076 A | 1/2009 | | |
| TW | I479481 B | 4/2015 | | |
| WO | WO-2014164728 A1 * | 10/2014 | | H04H 60/37 |

OTHER PUBLICATIONS

J. Haitsma, et al., 'A Highly Robust Audio Fingerprinting System' 3rd International Conference on Music Information Retrieval, Oct. 2002, pp. 107-115.
Office Action dated Mar. 29, 2021 in Taiwanese Application No. 109119330.
Jaap Haitsma, et al.,. "Robust Audio Hashing for Content Identification," International Workshop on Content-Based Multimedia Indexing, Sep. 2001.
Notification of Opinion dated Nov. 3, 2020 in Korean Application No. 10-2019-0070097.

* cited by examiner

ELECTRONIC APPARATUS FOR RECOGNIZING MULTIMEDIA SIGNAL AND OPERATING METHOD OF THE SAME

CROSS-REFERENCE TO RELATED APPLICATIONS

This U.S. non-provisional application and claims the benefit of priority under 35 U.S.C. § 365(c) to Korean Patent Application No. 10-2019-0070097, filed Jun. 13, 2019, the entire contents of which are incorporated herein by reference in their entirety.

BACKGROUND

Field

One or more example embodiments relate to an electronic apparatus for recognizing a multimedia signal and an operating method of the electronic apparatus.

Description of Related Art

In current communication environments, a query by humming (QbH) service may be being provided. To provide the QbH service, a server stores information associated with a large amount of audio files. A client transmits, to the server, an audio signal corresponding to a melody the client desires to retrieve and the server feeds back information about an audio file most similar to the audio signal to the client. To this end, the server compares the audio signal to each of the audios files of the large amount of audio files. In general, the server generates an audio fingerprint based on a feature of an audio signal to compare audio files. For example, the server may generate a fingerprint based on only an energy distribution according to a frequency direction in an audio signal. Accordingly, distortion may occur in the fingerprint due to a frequency component of noise in the audio signal, which may lead to degrading the accuracy of the server in retrieving audio files using the fingerprint.

SUMMARY

An example embodiment may provide an electronic apparatus and an operating method of the electronic apparatus that may minimize a distortion of a fingerprint generated from a multimedia signal.

An example embodiment may provide an electronic apparatus and an operating method of the electronic apparatus that may enhance the accuracy in retrieving multimedia files using a fingerprint.

According to an example embodiment, an operating method of an electronic apparatus, the method including segmenting a detection signal into a plurality of frames; segmenting each of the frames into a plurality of blocks; and representing each of the blocks as a hash word based on a time feature and a frequency feature for each of the blocks.

According to an example embodiment, an electronic apparatus including an input; and processing circuitry configured to segment a signal detected through the input into a plurality of frames, segment each of the frames into a plurality of blocks, and represent each of the blocks as a hash word based on a time feature and a frequency feature for each of the blocks.

According to an example embodiment, there is provided a non-transitory computer-readable storage medium storing instructions that, when executed by at least one processor, cause the at least one processor to perform an operating method of an electronic apparatus, the method including segmenting a detection signal into a plurality of frames; segmenting each of the frames into a plurality of blocks; and representing each of the blocks as a hash word based on a time feature and a frequency feature for each of the blocks.

According to some example embodiments, an electronic apparatus may generate a fingerprint of a signal by representing a hash word based on a time feature and a frequency feature of a detection signal. Through this, the electronic apparatus may minimize a distortion of the fingerprint. For example, although an error occurs in detecting one of the frequency feature and the time feature from the signal, a distortion of the fingerprint may be offset based on the other one of the frequency feature and the time feature. Accordingly, the accuracy of the electronic apparatus in generating the fingerprint may be enhanced. Further, the accuracy of the electronic apparatus in retrieving multimedia files using the fingerprint may be enhanced.

Further areas of applicability will become apparent from the description provided herein. The description and specific examples in this summary are intended for purposes of illustration only and are not intended to limit the scope of the present disclosure.

DETAILED DESCRIPTION

Figure 1:
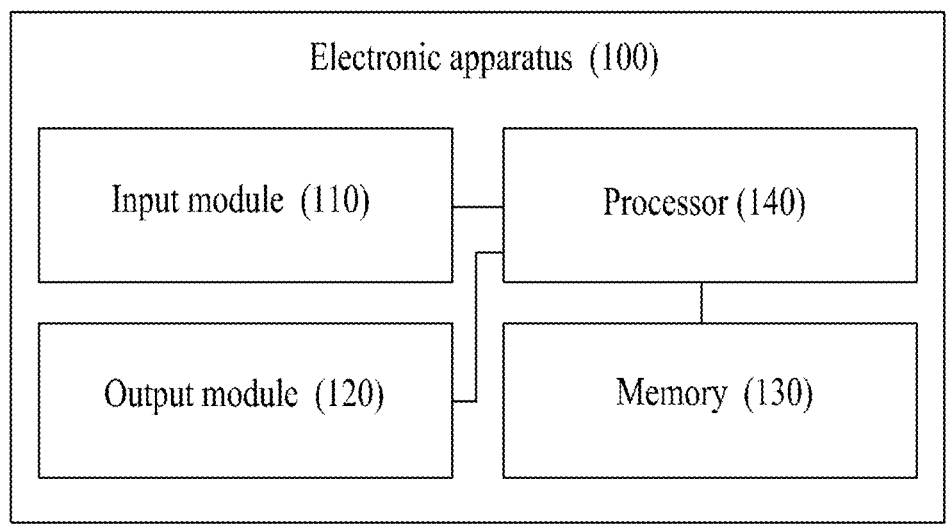
FIG. 1 is a diagram illustrating an example of an electronic apparatus according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealised or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

An electronic apparatus according to some example embodiments may be configured to recognize a multimedia signal. For example, the multimedia signal may include at least one of an audio signal and a video signal. The electronic apparatus may store a plurality of multimedia files and may detect at least one of multimedia files based on the multimedia signal. Here, the electronic apparatus may detect a similarity between a feature of the multimedia signal and features of the multimedia files and may detect at least one of the multimedia files based on the similarity. The electronic apparatus may generate a fingerprint of the multimedia signal based on the feature of the multimedia signal.

FIG. 1 illustrates an example of an electronic apparatus 100 according to at least one example embodiment.

Referring to FIG. 1, the electronic apparatus 100 may include at least one of an input module 110, an output module 120, a memory 130, and a processor 140. Depending on example embodiments, at least one of components of the electronic apparatus 100 may be omitted or at least one another component may be added to the electronic apparatus 100.

The input module 110 may be configured to input an instruction or a signal to be processed by at least one component of the electronic apparatus 100. The input module 110 may include at least one of an input device configured for a user to directly input an instruction or data to the electronic apparatus 100, a sensor device configured to generate a signal by detecting an ambient environment, and/or a communication device configured to receive an instruction or data through communication with an external device (not shown). For example, the input device may include at least one of a microphone, a camera, a mouse, and a keyboard. For example, the communication device may include at least one of a wired communication module (e.g., power-line communication (PLC) devices, and/or Ethernet over ooax/twisted-pair (EoC/EoTP) devices) and a wireless communication module. The wireless communication module may, for example, communicate with an external device through at least one of a remote communication network (e.g., a wireless broadband communication) and a near distance communication network (e.g., a Bluetooth and/or wireless access point network).

The output module 120 may be configured to provide information to outside the electronic apparatus 100. The output module 120 may include at least one of a display device configured to provide visual information (e.g., a screen), an audio device configured to provide auditory information (e.g., a speaker), and/or a communication device configured to transmit information. For example, the display device may include at least one of a display, a hologram device, and a projector. In some example embodiments, the display device may include at least one of a touch circuit configured to detect a touch and a sensor circuit configured to measure a magnitude of force generated by the touch. Through illustrated as separate devices, the input module 110 and the output module 120 may comprise a single device or include overlapping elements. For example, a touch screen may include elements of both the input module 110 (e.g., a touch circuit) and the output module 120 (e.g., a screen) and the communication module may comprise both the input module 110 and the output module 120.

The memory 130 may store a variety of data used by at least one component of the electronic apparatus 100. For example, the memory 130 may include at least one of a volatile memory and a nonvolatile memory. Data may include a program or input data or output data related thereto. For example, the memory 130 may include at least one of a plurality of multimedia files and meta information about each of the multimedia files.

The processor 140 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc. The processor 140 may be configured to control at least one component of the electronic apparatus 100 and may perform data processing or operation by executing a program of the memory 130. The processor 140 may receive a multimedia signal detected through the input module 110. Here, the multimedia signal may include at least one of an audio signal and/or a visual signal (e.g. a video signal, an image signal, and/or typographical signal). The processor 140 may segment the multimedia signal into a plurality of frames. Here, the frames may be defined by a time axis and a frequency axis and may overlap each other. Each of the frames may have an energy distribution over time and frequency. The processor 140 may generate a fingerprint for each of the frames. Here, the fingerprint may be represented, for example, as an array of hash words.

The processor 140 may be configured to segment each frame into a plurality of blocks. Here, the blocks may be aligned in the same frame and at least one of a time and a frequency may differ accordingly. The processor 140 may be configured to calculate a time feature and a frequency feature for each of the blocks. Here, the time feature may represent an energy distribution over time and the frequency feature may represent an energy distribution over frequency. To this end, the processor 140 may calculate a differential value through a combination D of both directions on a time axis and both directions on a frequency axis. The processor 140 may be configured to detect a hash word for each of the blocks based on the time feature and the frequency feature, with respect to each of the blocks. Here, the processor 140 may detect a hash word for each of the blocks based on an energy differential value for each of the blocks. For example, the processor 140 may detect a hash word corresponding to the differential value by comparing the differential value to a threshold. Here, the threshold may be determined as a differential value in a previous frame.

According to some example embodiments, the electronic apparatus 100 may be configured to generate a fingerprint of a signal by representing a hash word based on a time feature as well as a frequency feature of a detection signal. Through this, the electronic apparatus 100 may minimize a distortion of the fingerprint. That is, although an error occurs in detecting one of the frequency feature and the time feature from the signal, the distortion of the fingerprint may be offset based on the other one of the frequency feature and the time feature. For example, although a signal may include noise, the distortion of the fingerprint caused by the noise may be offset by a frequency component of the noise. Accordingly, the accuracy of the fingerprint generated by the electronic apparatus 100 may be enhanced. Further, the accuracy of the electronic apparatus 100 in retrieving multimedia files using the fingerprint may be enhanced.

According to another example embodiment, the processor 140 may be configured to segment a detection signal into a plurality of frames, to segment each of the frames into a plurality of blocks, and to represent each of the blocks as a hash word based on a time feature and a frequency feature for each of the blocks.

According to some example embodiments, the time feature may represent an energy distribution over time with respect to each of the blocks, and the frequency feature may represent an energy distribution over frequency with respect to each of the blocks.

According to some example embodiments, the blocks may be defined by a time axis and a frequency axis that intersect.

According to some example embodiments, the processor 140 may be configured to detect a hash word for each of the blocks based on a differential value calculated through a combination of both directions on the time axis and both directions on the frequency axis, and to represent each of the blocks as the detected hash word.

According to some example embodiments, the processor 140 may be configured to calculate a first differential value according to a first time direction of the time axis and a first frequency direction of the frequency axis, to calculate a second differential value according to a second time direction of the time axis and a second frequency direction of the frequency axis, to calculate the differential value by adding up the first differential value and the second differential value, and to detect the hash word based on the differential value.

According to some example embodiments, the processor 140 may be configured to calculate the differential value by calculating at least one of a third differential value according to the first time direction and the second frequency direction and a fourth differential value according to the second time direction and the first frequency direction and by adding up at least one of the third differential value and the fourth differential value with the first differential value and the second differential value.

According to some example embodiments, the processor 140 may be configured to detect the hash word corresponding to the differential value by comparing the differential value and a threshold.

According to some example embodiments, the threshold may be determined as a differential value in a previous frame among the frames to compare to a differential value in a current frame.

According to example embodiments, the processor 140 may be configured to detect the hash word as 1 if the differential value exceeds the threshold, and to detect the hash word as 0 if the differential value is less than or equal to the threshold.

Figure 2:
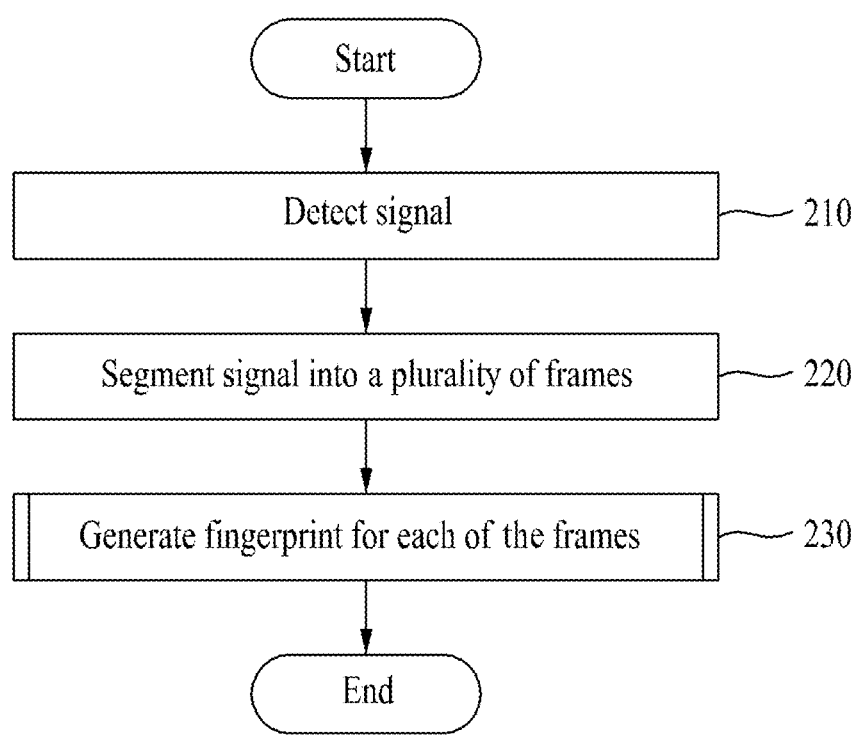
FIG. 2 is a flowchart illustrating an example of an operating method of an electronic apparatus according to at least one example embodiment.
Figure 8A:
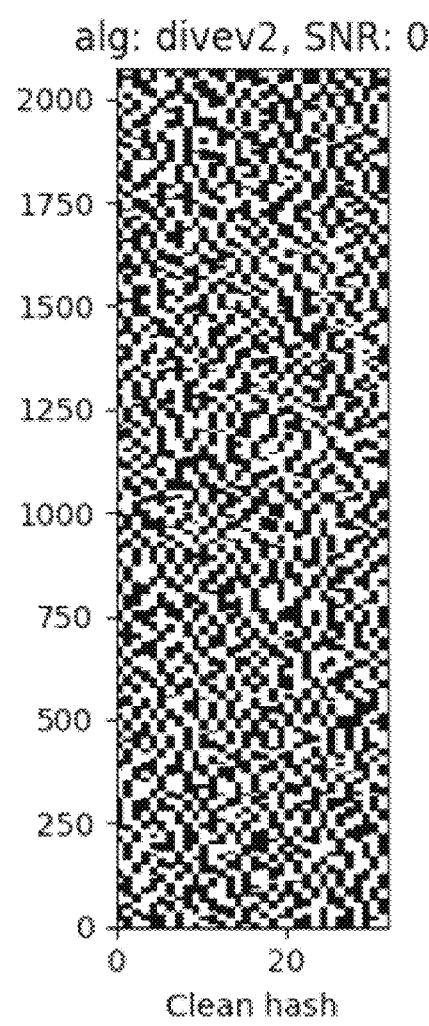
FIGS. 8A, 8B, and 8C, illustrate examples of a fingerprint of a multimedia signal according to at least one example embodiment.
Figure 8B:
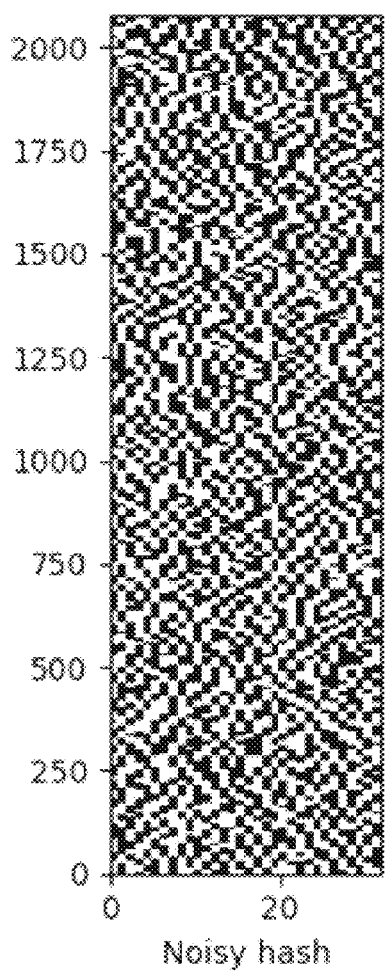
Figure 8C:
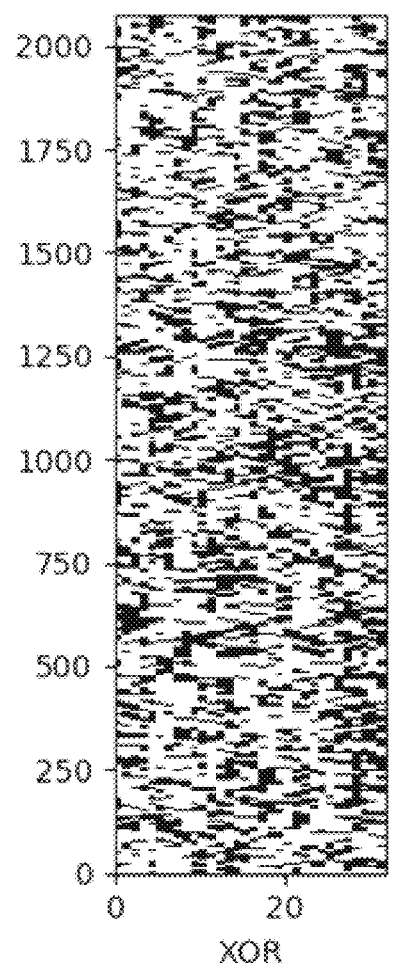
Figure 9A:
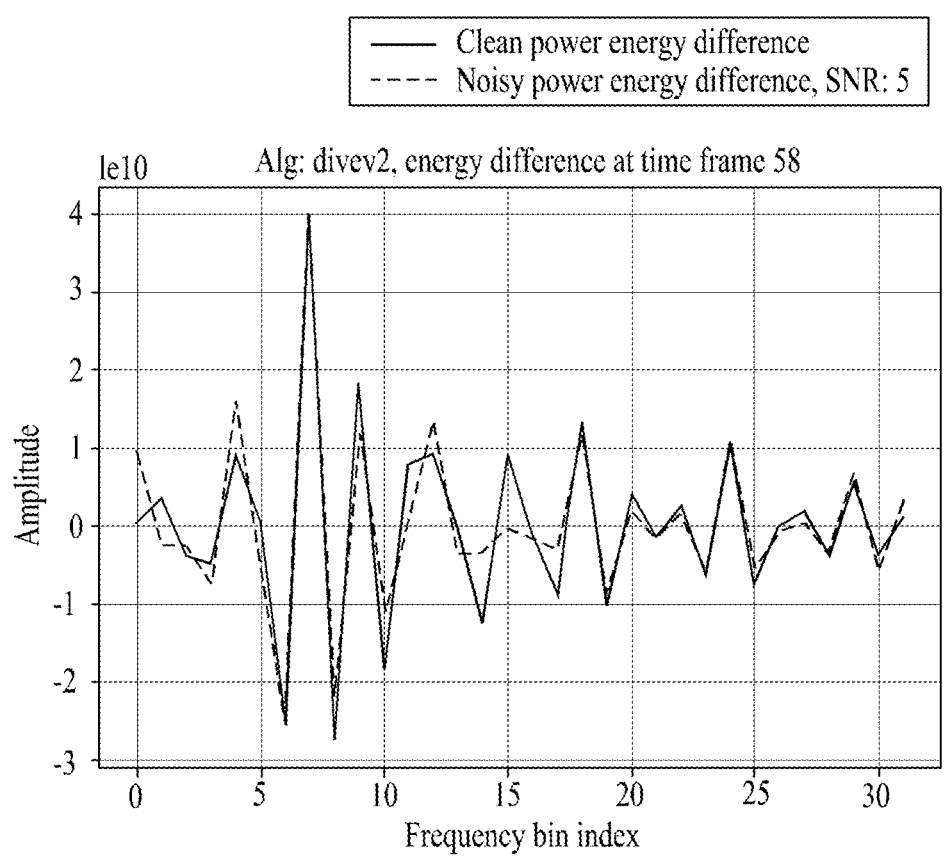
FIGS. 9A, 9B, 9C, and 9D are graphs showing examples of a feature derived from a fingerprint according to at least one example embodiment.
Figure 9B:
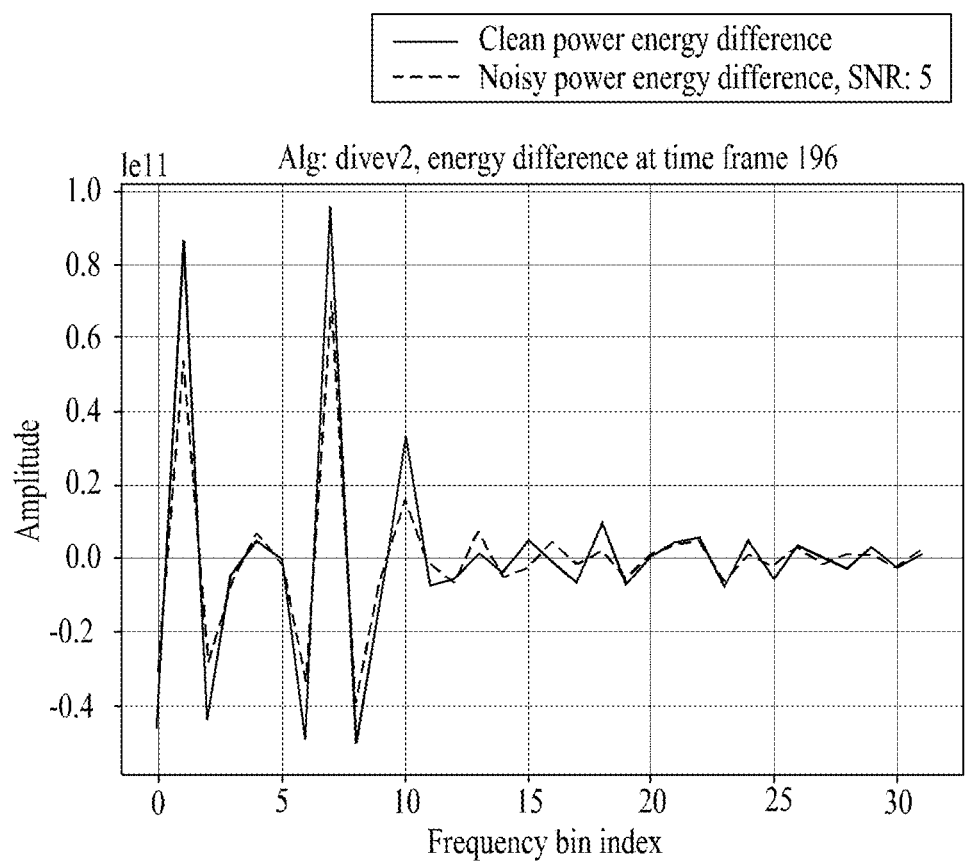
Figure 9C:
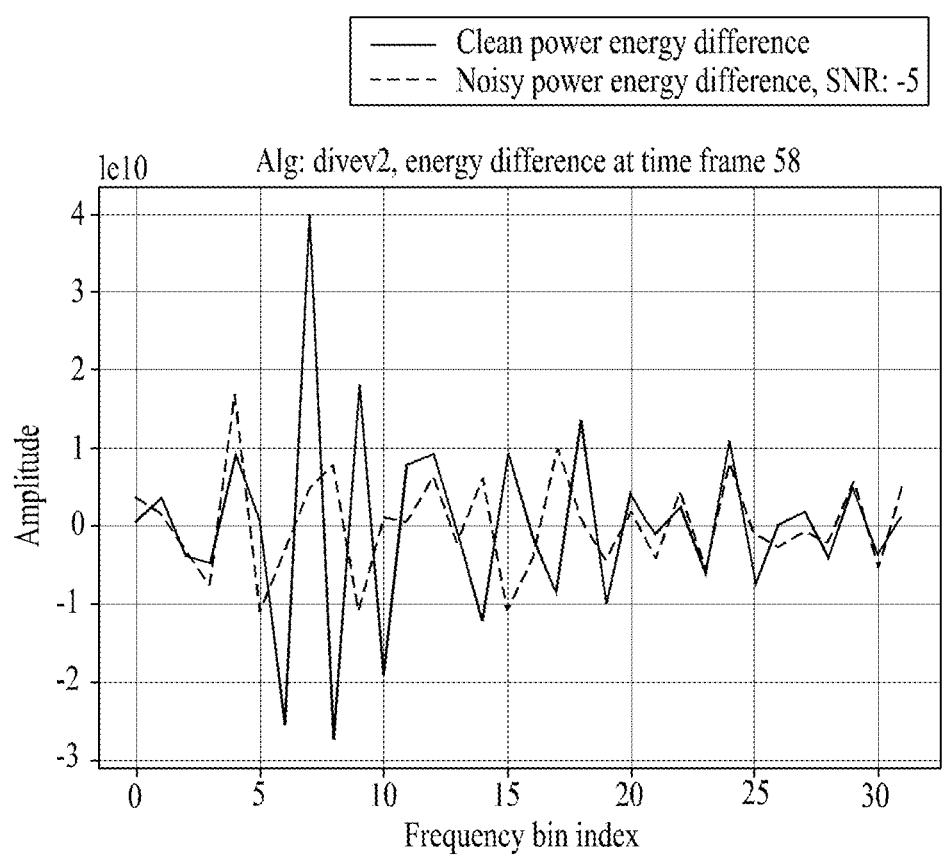
Figure 9D:
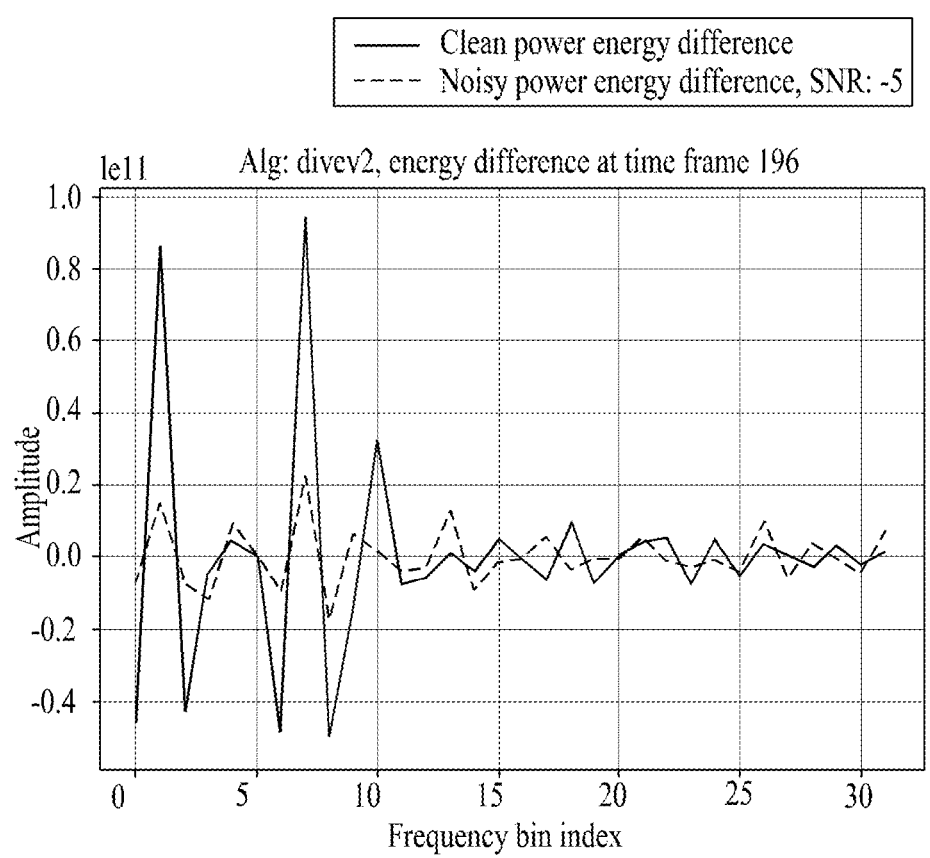

FIG. 2 is a flowchart illustrating an example of an operating method of the electronic apparatus 100 according to at least one example embodiment. FIGS. 4A and 4B, 5A and 5B, 6A, 6B, 6C, and 6D, and 7A, 7B, 7C, and 7D are graphs showing examples of a feature of a multimedia signal according to at least one example embodiment. FIGS. 8A, 8B, and 8C, illustrate examples of a fingerprint of a multimedia signal according to at least one example embodiment. FIGS. 9A, 9B, 9C, and 9D are graphs showing examples of a feature derived from a fingerprint according to at least one example embodiment.

Referring to FIG. 2, in operation 210, the electronic apparatus 100 may detect a multimedia signal. The processor 140 may detect the multimedia signal through the input device 110. The multimedia signal may include at least one of an audio signal and a video signal.

Figure 4A:
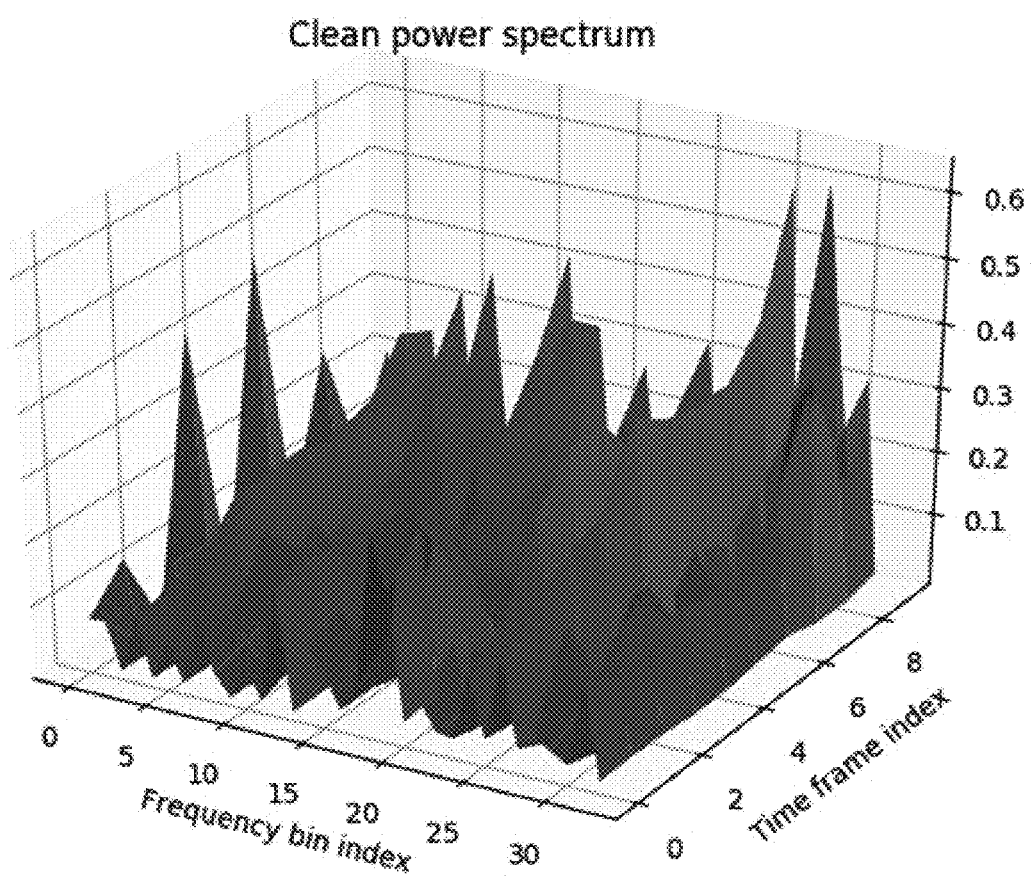
FIGS. 4A and 4B, 5A and 5B, 6A, 6B, 6C, and 6D, and 7A, 7B, 7C, and 7D are graphs showing examples of a feature of a multimedia signal according to at least one example embodiment.
Figure 4B:
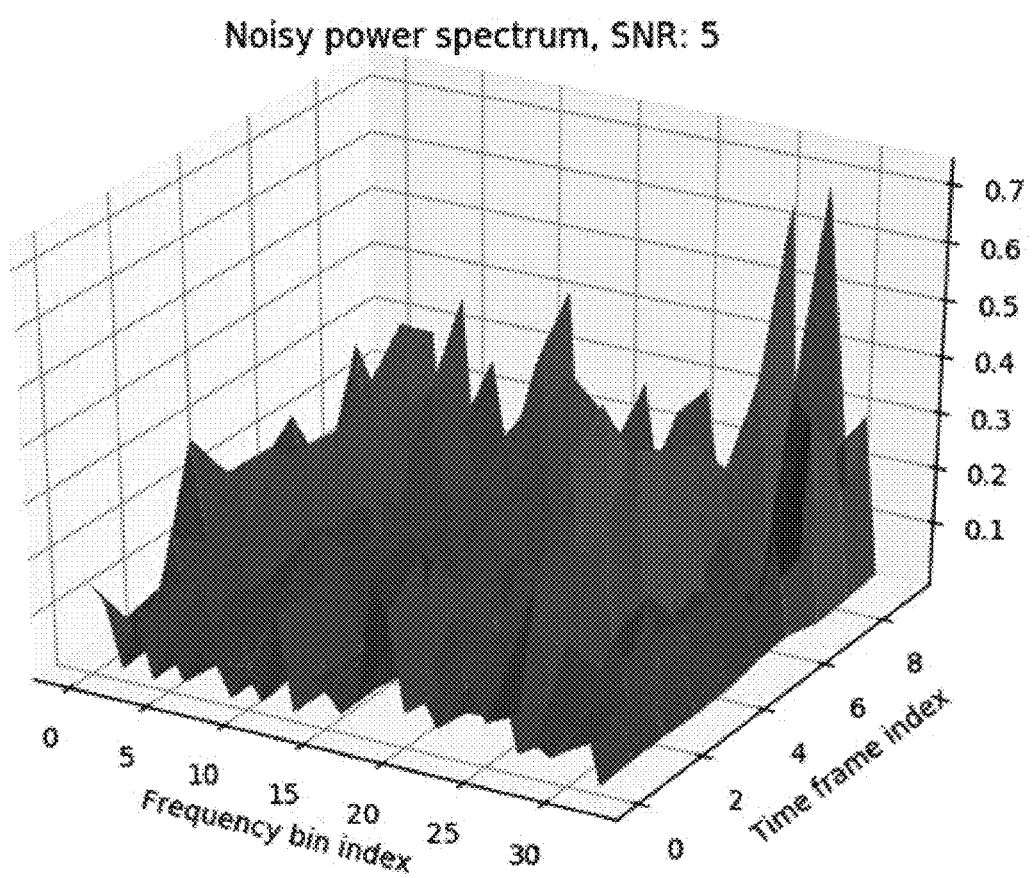
Figure 5A:
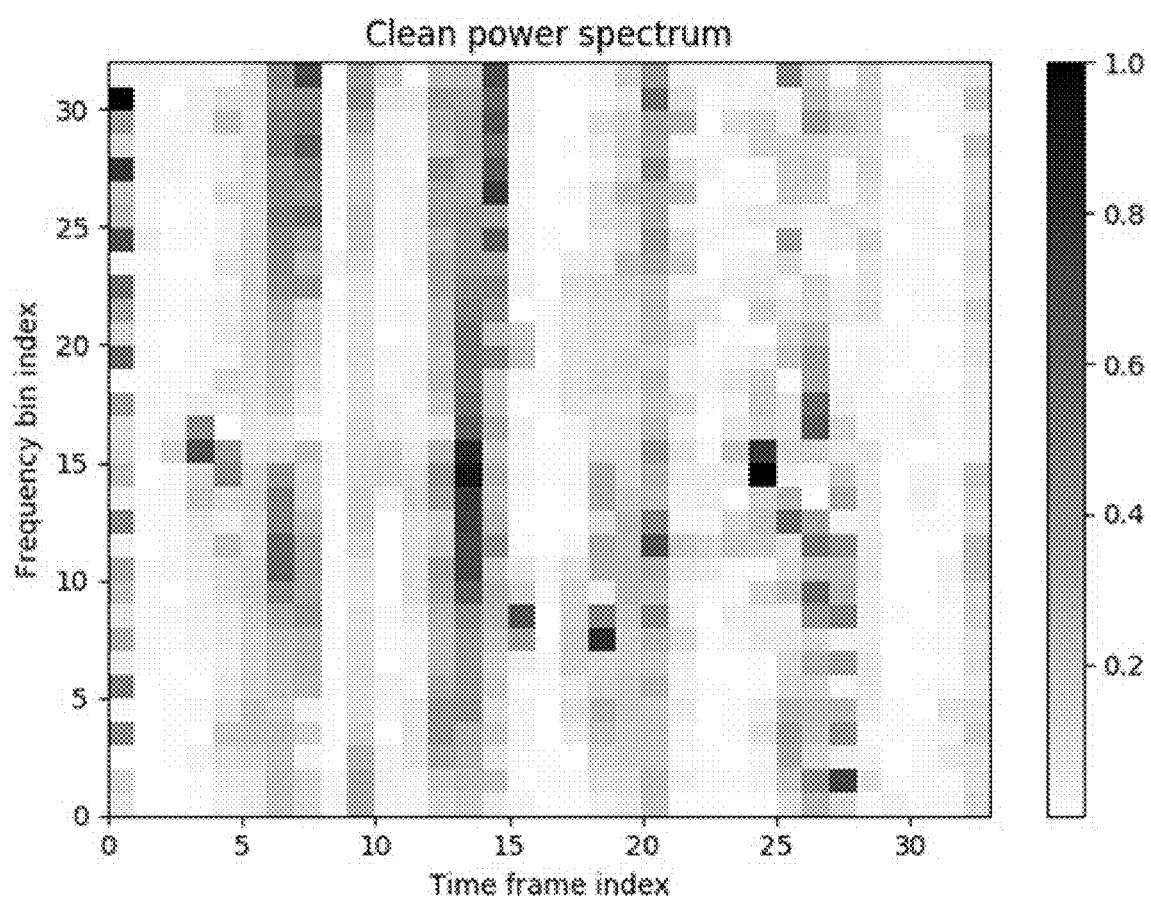
Figure 5B:
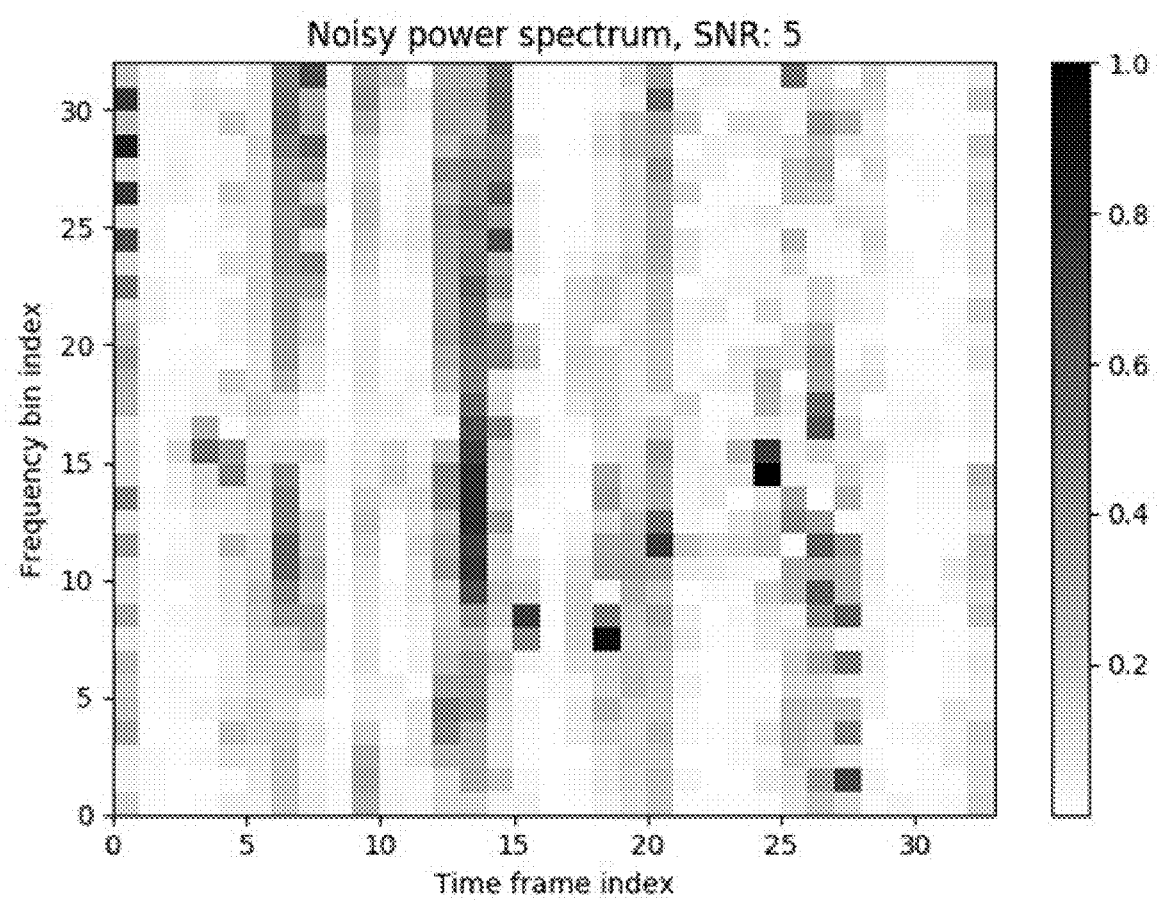
Figure 6A:
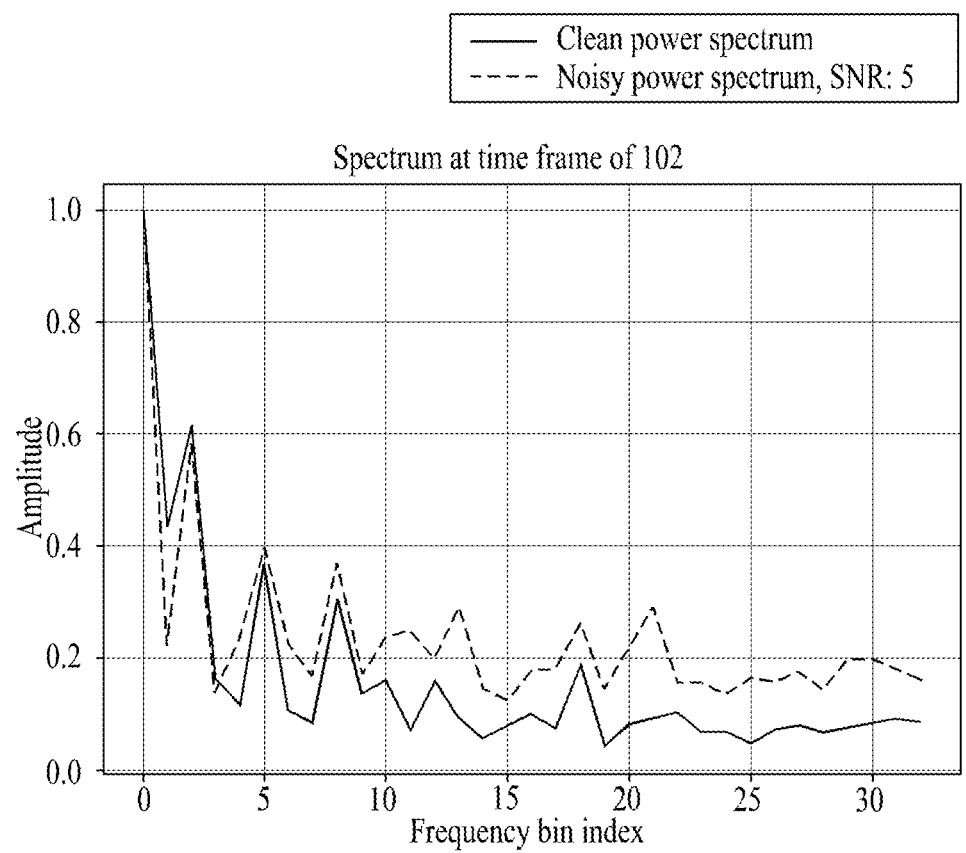
Figure 6B:
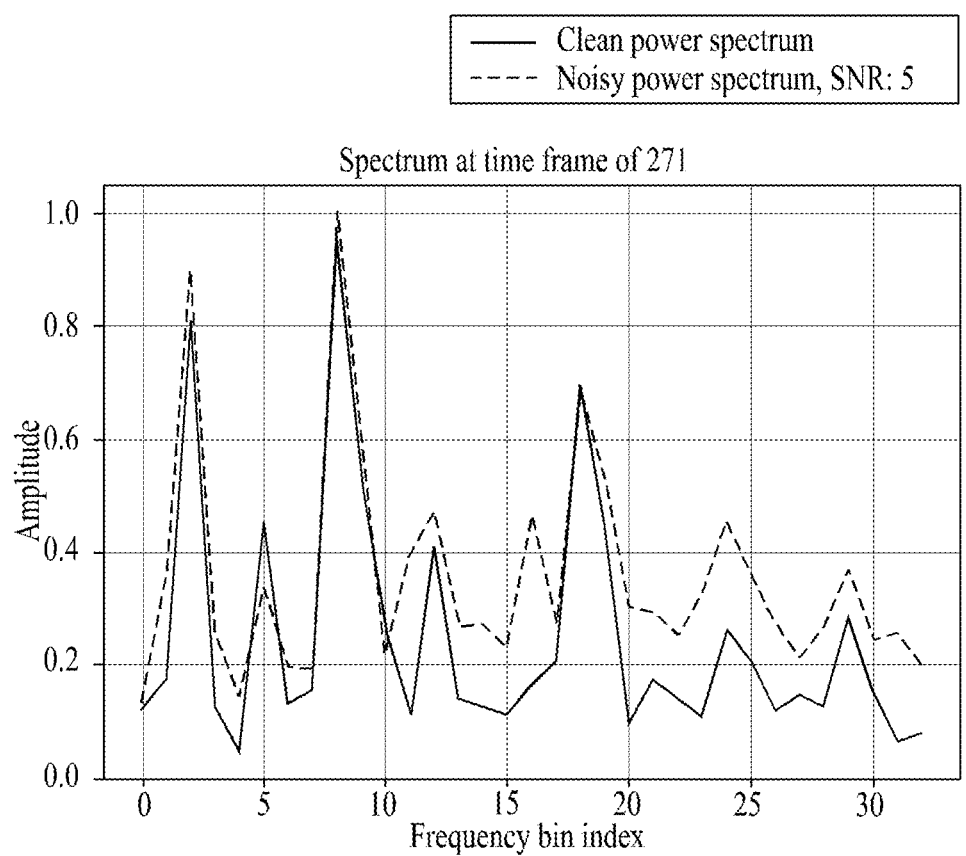
Figure 6C:
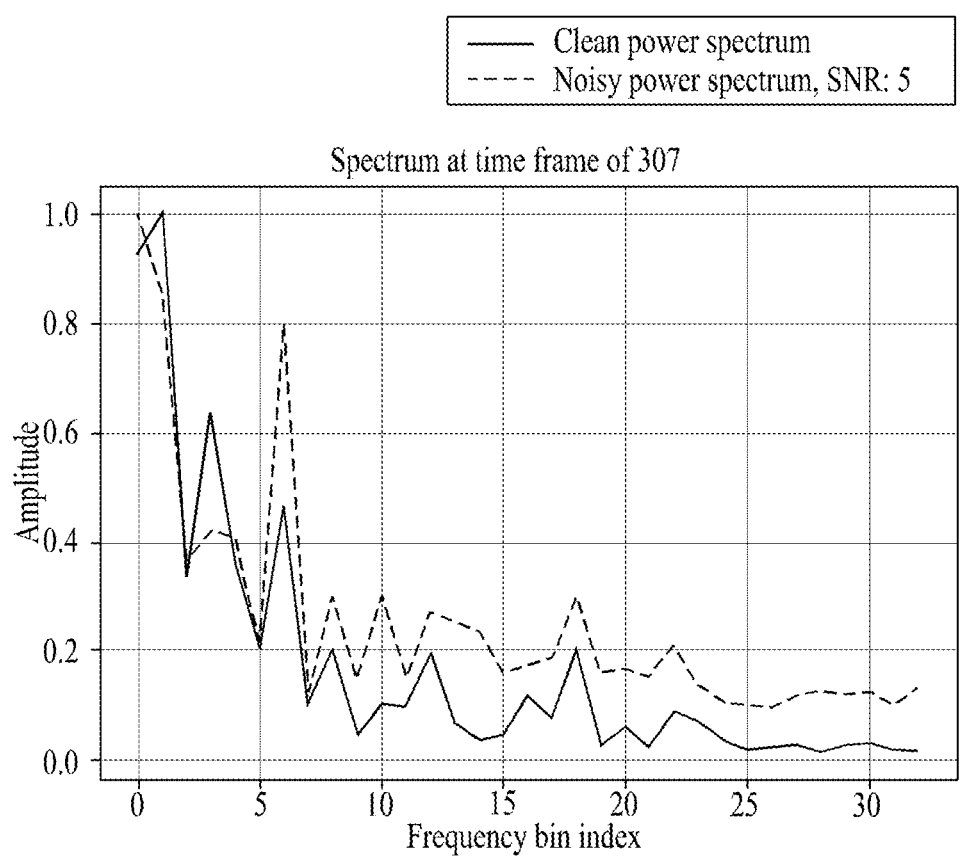
Figure 6D:
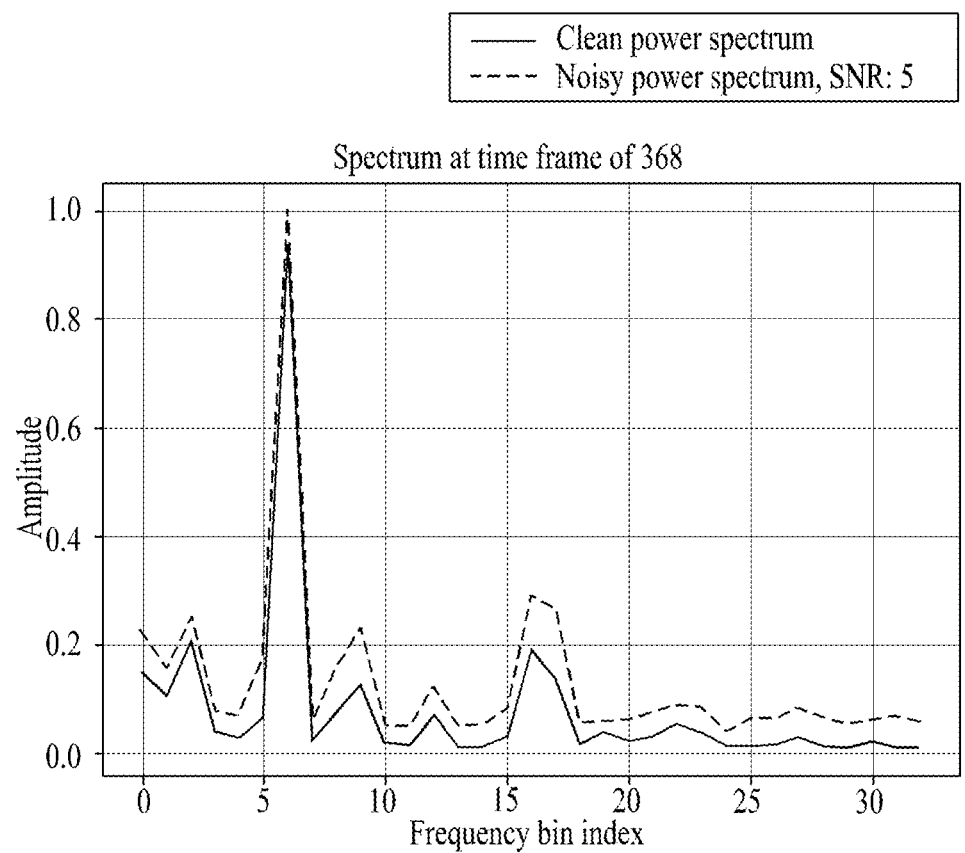
Figure 7A:
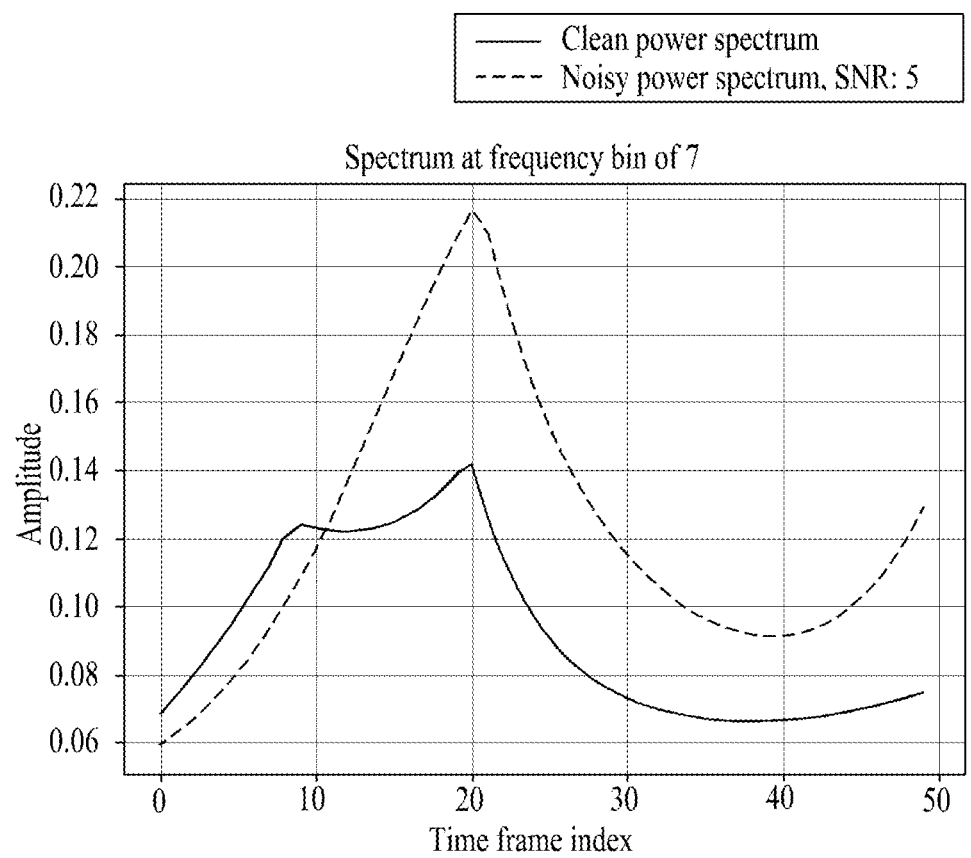
Figure 7B:
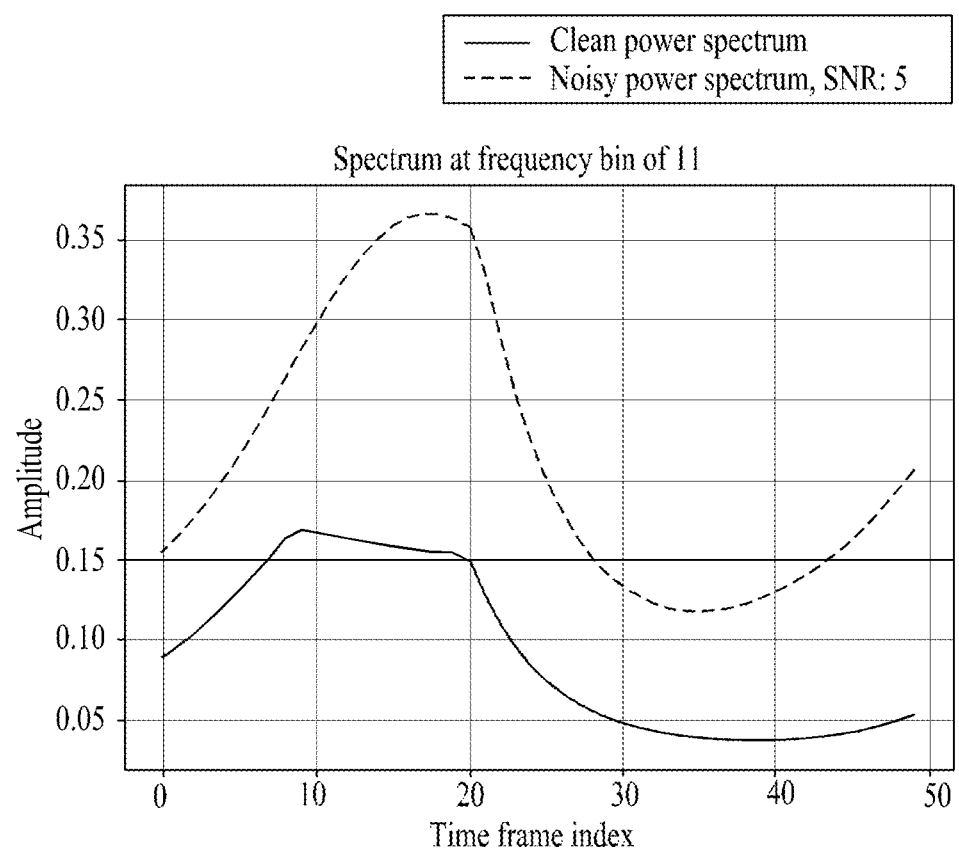
Figure 7C:
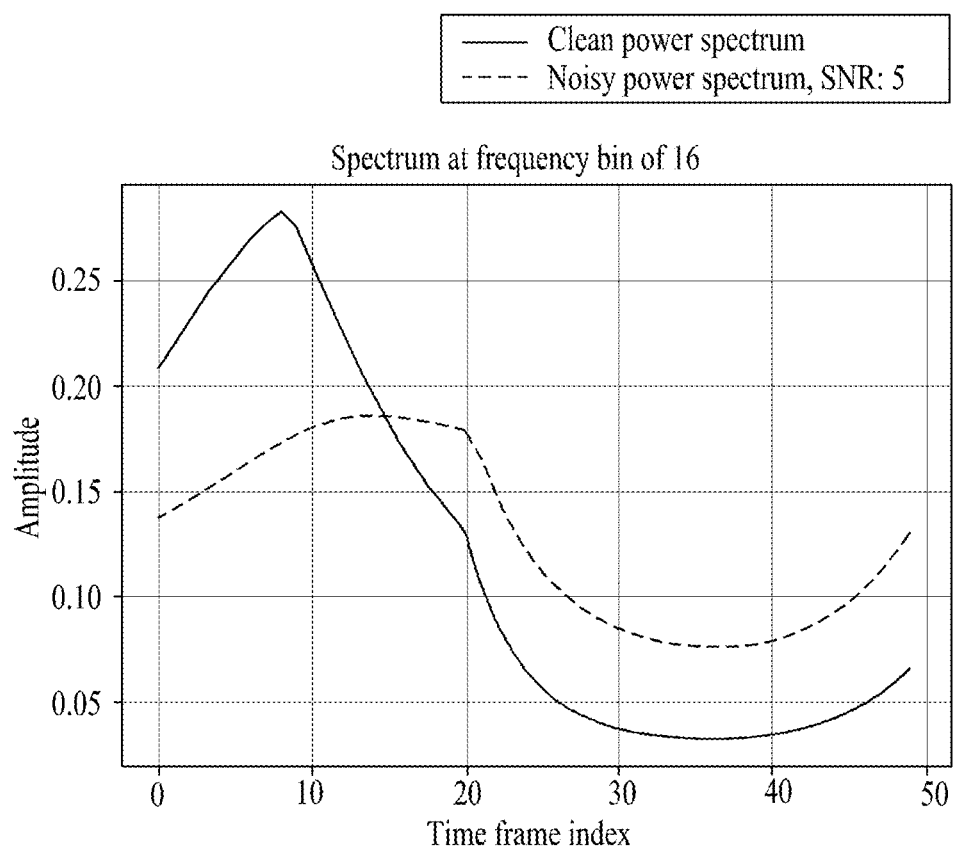
Figure 7D:
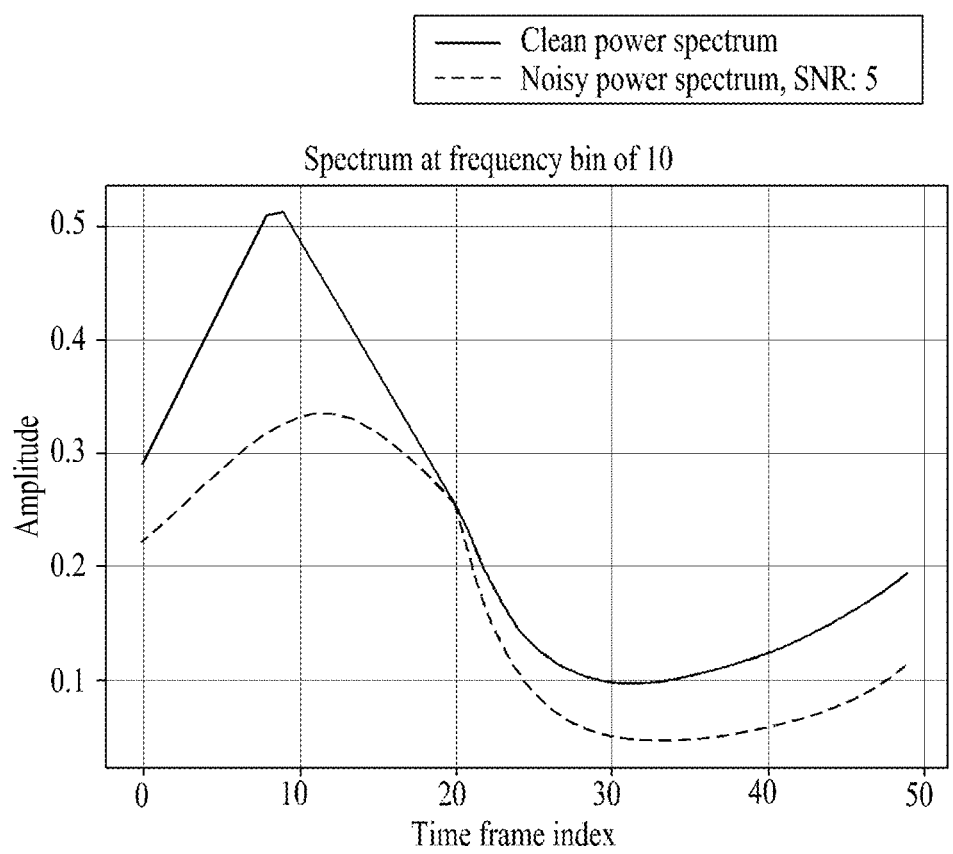

For example, referring to FIGS. 4A and 4B, and 5A and 5B, the audio signal may be represented as a spectrum that represents an energy distribution over a time domain and a frequency domain. Here, the spectrum of the audio signal may be three-dimensionally represented as shown in FIGS. 4A and 4B, and may be two-dimensionally represented as shown in FIGS. 5A and 5B. Here, if the audio signal does not include noise, the spectrum of the audio signal may be represented as shown in FIG. 4A and FIG. 5A. In contrast, if the audio signal includes noise, the spectrum of the audio signal may be represented as shown in FIG. 4B and FIG. 5B.

In operation 220, the electronic apparatus 100 may segment the multimedia signal into a plurality of frames. Here, the frames may be defined by a time axis and a frequency axis and may overlap. Here, each of the frames may have an energy distribution over each of time and frequency. According to an example embodiment, the processor 140 may execute at least one of a framing operation, a Fourier transform operation, and an absolute value operation. The framing operation may classify frames. The Fourier transform operation may determine a Fourier coefficient about an energy distribution over time and frequency in each of the frames. The absolute value operation may calculate an absolute value of a Fourier coefficient value. The framing operation, the Fourier transform operation, and the absolute value operation may be executed, for example, a framing circuit, a Fourier transform circuit, and an absolute value circuit, respectively. The framing circuit, Fourier transforms circuit, and absolute value circuit may, for example, comprise part of the processing circuitry (e.g., hardware including logic circuits; a hardware/software combination such as a processor executing software; or a combination thereof).

For example, with respect to one of frames segmented from an audio signal, an energy distribution over frequency at each time may be represented as shown in FIGS. 6A, 6B, 6C, and 6D. Here, the energy distribution over frequency at each time may be differently represented depending on whether the audio signal includes noise. Meanwhile, with respect to one of the frames segmented from the audio signal, an energy distribution over time at each frequency may be represented as shown in FIGS. 7A, 7B, 7C, and 7D. Here, the energy distribution over time at each frequency may be differently represented depending on whether the audio signal includes noise. However, features in the energy distribution over time at each frequency (e.g., spectral peaks) may be maintained regardless of whether the audio signal includes noise.

In operation 230, the electronic apparatus 100 may generate a fingerprint for each of the frames. The processor 140 may represent an energy distribution over time and frequency for each of frames as a fingerprint. Here, the fingerprint may be represented as an array of hash words. According to some example embodiments, the processor 140 may generate a fingerprint for each of the frames to compare energy distributions of adjacent two frames among frames. To this end, a current frame for which a fingerprint is to be generated and a previous frame adjacent to the current frame may be defined among the frames.

Referring to FIGS. 8A, 8B, and 8C, the processor 140 may generate a fingerprint. In the fingerprint, a pixel in white may represent a hash word having a bit value of 1 and a pixel in black may represent a hash word having a bit value of 0. Here, if the audio signal does not include noise, the fingerprint may be represented by a bit map, for example as shown in FIG. 8A. In another example, if the audio signal does not include noise the fingerprint may be represented as shown in FIG. 8B. Noise of the audio signal may be represented as shown in FIG. 8C.

Figure 3:
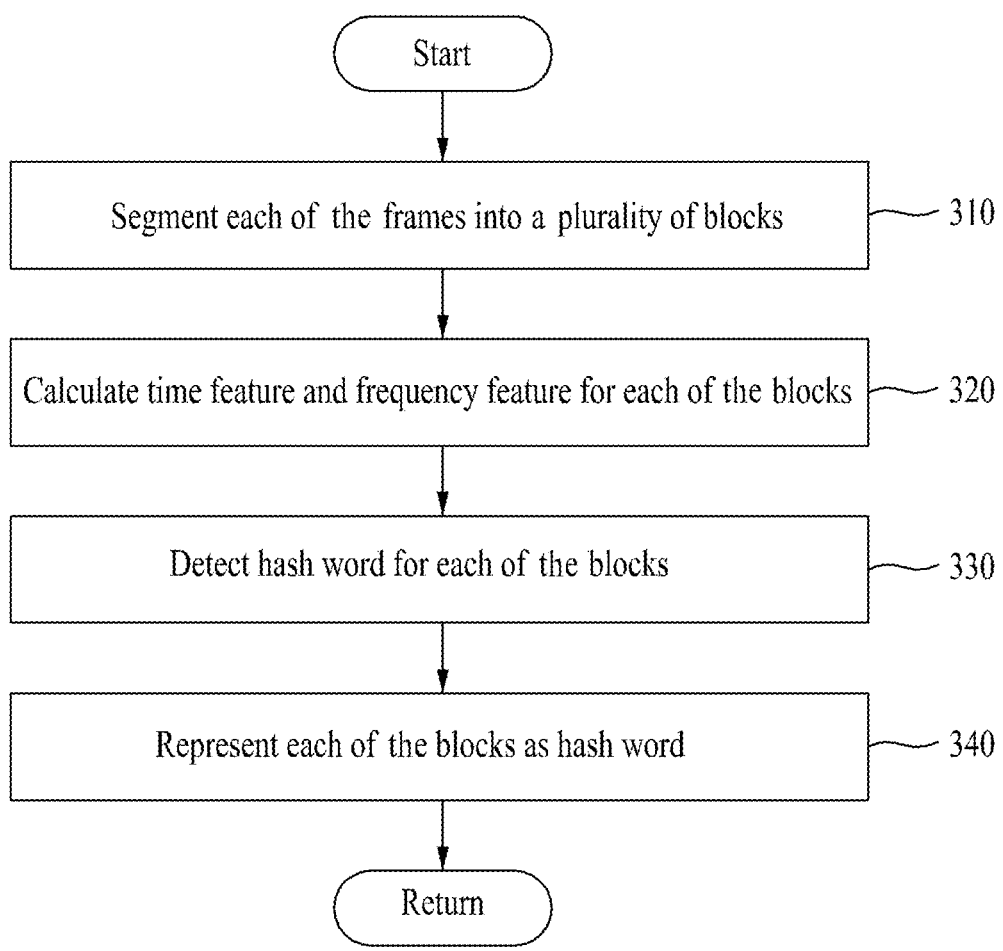
FIG. 3 is a flowchart illustrating a fingerprint generation operation of FIG. 2.

FIG. 3 is a flowchart illustrating a fingerprint generation operation of FIG. 2 according to at least one example embodiment.

Referring to FIG. 3, in operation 310, the electronic apparatus 100 may segment each of the frames into a plurality of blocks. For example, the processor 140 of the electronic apparatus 100 may segment each of the frames into the plurality of blocks. Here, the blocks may be defined by a time axis and a frequency axis that intersect. Here, the blocks may be aligned in the same frame and accordingly, at least one of a time and a frequency may differ. According to an example embodiment, the processor 140 may include a band division circuit and the band division circuit may segment each of the frames into the plurality of blocks based on a predetermined time band and frequency band. For example, the band division circuit may include a plurality of selectors and the plurality of selectors may detect the plurality of blocks, respectively.

In operation 320, the electronic apparatus 100 may detect a time feature and a frequency feature for each of the blocks. The processor 140 may calculate the time feature and the frequency feature for each of the blocks. Here, the time feature may represent an energy distribution over time and the frequency feature may represent an energy distribution over frequency. For example, the processor 140 may calculate an energy differential value for each of the blocks based on a direction of an energy gradient relative to the time axis and the frequency axis.

According to some example embodiments, the processor 140 may calculate a differential value through a combination D of both directions on the time axis and both directions on the frequency axis with respect to each of the blocks. The processor 140 may calculate the differential value according to the following Equation 1. For example, the processor 140 may add up at least one differential value according to the combination D of at least one of both directions on the time axis and at least one of both directions on the frequency axis with respect to each of the blocks. Here, the directions on the time axis may be defined as a first time direction and a second time direction opposite thereto and the directions on the frequency axis may be defined as a first frequency direction and a second frequency direction opposite thereto. For example, the first time direction and the second time direction may be represented as 1 and −1 from a normal, respectively, and the first frequency direction and the second frequency direction may be represented as 1 and −1 from a normal, respectively. In this case, the combination D of both directions on the time axis and both directions on the frequency axis may include at least one of (1, 1), (1, −1), (−1, 1), and (−1, −1).

$$\sum_{(i,j)\in D}^{D} E[n+i, m+j] - E[n, m] \qquad \text{[Equation 1]}$$

In Equation 1, n denotes a time band, m denotes a frequency band, and E denotes band-summed energy.

According to an example embodiment, the processor 140 may calculate a first differential value according to the first time direction and the first frequency direction, and may calculate a second differential value according to the second time direction and the second frequency direction. Through this, the processor 140 may calculate an energy differential value for each of the blocks by adding up the first differential value and the second differential value. For example, the combination D of both directions on the time axis and both directions on the frequency axis may include (−1, 1) and (−1, −1).

According to another example embodiment, the processor 140 may calculate the first differential value according to the first time direction and the first frequency direction, and may calculate the second differential value according to the second time direction and the second frequency direction. In addition, the processor 140 may calculate at least one of a third differential value according to the first time direction and the second frequency direction and a fourth differential value according to the second time direction and the first frequency direction. The processor 140 may calculate the energy differential value for each of the blocks by adding up at least one of the third differential value and the fourth differential value with the first differential value and the second differential value. As another example, the combination D of both directions on the time axis and both directions on the frequency axis may include (1, 1), (−1, 1), and (−1, −1), or may include (1, −1), (−1, 1), and (−1, −1).

In operation 330, the electronic apparatus 100 may detect a hash word for each of the blocks based on the time feature and the frequency feature for each of the blocks. Here, the processor 140 may detect the hash word for each of the blocks based on the energy differential value for each of the blocks. For example, the processor 140 may detect a hash word corresponding to a differential value by comparing the differential value to a threshold as represented by the following Equation 2. Here, the threshold may be determined as a differential value in a previous frame to compare to a differential value in a current frame. The previous frame may be one previous frames in the time axis and/or the frequency axis. For example, the processor 140 may detect the hash word as 1 if the differential value exceeds the threshold and may detect the hash word as 0 if the differential value is less than or equal to the threshold.

$$H[n, m] = \begin{cases} 1 & \text{if } \left( \sum_{(i,j) \in D}^{D} E[n+1+i, m+j] - E[n+1, m] \right) > \left( \sum_{(i,j) \in D}^{D} E[n+i, m+j] - E[n, m] \right) \\ 0 & \text{if } \left( \sum_{(i,j) \in D}^{D} E[n+1+i, m+j] - E[n+1, m] \right) \leq \left( \sum_{(i,j) \in D}^{D} E[n+i, m+j] - E[n, m] \right) \end{cases} \quad \text{[Equation 2]}$$

In operation 340, the electronic apparatus 100 may represent each of the blocks as the hash word. The processor 140 may represent each of the blocks as the hash word as shown in FIGS. 8A, 8B, and 8C. For example, for each of the blocks, the processor 140 may represent the hash word using a pixel in white if the hash word is 1 and may represent the hash word as a pixel in black if the hash word is 0.

Through this, a fingerprint for each of the frames may be generated. For example, an energy distribution over frequency at each time may be derived from the fingerprint for each of the frames as shown in FIGS. 9A, 9B, 9C, and 9D. Here, the energy distribution over frequency at each time may be differently represented depending on whether an audio signal includes noise. However, features in the energy distribution over frequency at each time, that is, spectral peaks may be maintained regardless of whether the audio signal includes noise. That is, although the audio signal includes noise, the spectral peaks may be clearly represented. Thereafter, the electronic apparatus 100 may compare the fingerprint for each frame to stored and/or known fingerprints for known multimedia files (e.g., known audio files like songs, speeches, or songs, and/or known video files), and/or the electronic apparatus 100 may transmit the fingerprint for each frame to a processor, for example to a server configured to search and compare the fingerprints, to have the fingerprints for each frame compared to the fingerprints for known multimedia files.

According to some example embodiments, the electronic apparatus 100 may generate a fingerprint of a signal by representing a hash word based on a time feature as well as a frequency feature of a detection signal. Through this, the electronic apparatus 100 may minimize a distortion of the fingerprint. That is, although an error occurs in detecting one of the frequency feature and the time feature from the signal, the distortion of the fingerprint may be offset based on the other one of the frequency feature and the time feature. For example, although a signal includes noise, the distortion of the fingerprint may be offset by a frequency component of noise. Accordingly, the accuracy of the electronic apparatus 100 in generating the fingerprint may be enhanced. Further, the accuracy of the electronic apparatus 100 in retrieving multimedia files using a fingerprint may be enhanced.

An operating method of the electronic apparatus 100 according to some example embodiments may include segmenting a detection signal into a plurality of frames, segmenting each of the frames into a plurality of blocks, and representing each of the blocks as a hash word based on a time feature and a frequency feature for each of the blocks.

According to some example embodiments, the time feature may represent an energy distribution over time with respect to each of the blocks, and the frequency feature may represent an energy distribution over frequency with respect to each of the blocks.

According to some example embodiments, the blocks may be defined by a time axis and a frequency axis that intersect.

According to some example embodiments, the hash word representing operation may include detecting a hash word for each of the blocks based on a differential value calculated through a combination of both directions on the time axis and both directions on the frequency axis, and representing each of the blocks as the detected hash word.

According to some example embodiments, the hash word detecting operation may include calculating a first differential value according to a first time direction of the time axis and a first frequency direction of the frequency axis, calculating a second differential value according to a second time direction of the time axis and a second frequency direction of the frequency axis, calculating the differential value by adding up the first differential value and the second differential value, and detecting the hash word based on the differential value.

According to some example embodiments, the hash word detecting operation may further include at least one of calculating a third differential value according to the first time direction and the second frequency direction and calculating a fourth differential value according to the second time direction and the first frequency direction.

According to some example embodiments, the differential value calculating operation may include calculating the differential value by adding up at least one of the third differential value and the fourth differential value with the first differential value and the second differential value.

According to some example embodiments, the hash word detecting operation may include detecting the hash word corresponding to the differential value by comparing the differential value and a threshold.

According to some example embodiments, the threshold may be determined as a differential value in a previous frame among the frames to compare to a differential value in a current frame among the frames.

According to some example embodiments, the hash word detecting operation may include detecting the hash word as 1 if the differential value exceeds the threshold, and detecting the hash word as 0 if the differential value is less than or equal to the threshold.

Some example embodiments may be implemented as software including at least one instruction stored in a storage medium (e.g., the memory 130) readable by a machine (e.g., the electronic apparatus 100). For example, a processor (e.g., the processor 140) of the machine may call at least one instruction among instructions stored in the storage medium and may execute the at least one instruction. Accordingly, the machine may perform at least one function in response to the at least one instruction. The at least one instruction, for example, may include a code generated by a compiler or a code executable by an interpreter. The storage medium readable by the machine may be provided in a form of a non-transitory storage medium. Here, the term "non-transitory" may indicate that the storage medium is tangible and does not include a signal (e.g., an electromagnetic wave). The term does not distinguish a case in which data is semi-permanently stored in the storage medium from a case in which data is transitorily stored in the storage medium.

A non-transitory computer-readable storage medium according to example embodiments may store at least one program to perform operations of segmenting a detection signal into a plurality of frames, segmenting each of the frames into a plurality of blocks, and representing each of the blocks as a hash word based on a time feature and a frequency feature for each of the blocks.

The terms used herein are used to explain specific example embodiments, are not construed to limit the disclosure, and should be understood to include various modifications, equivalents, and/or substitutions of the example embodiments. In the drawings, like reference numerals refer to like components throughout the present specification. The singular forms "a," "an," and "the" are intended to include the plural forms as well, unless the context clearly indicates otherwise. Herein, the expressions, "A or B," "at least one of A and/or B," "A, B, or C," "at least one of A, B, and/or C," and the like may include any possible combinations of listed items. Terms "first," "second," etc., are used to describe various components and the components should not be limited by the terms. The terms are simply used to distinguish one component from another component. When a component, for example, a first component, is described to be "(functionally or communicatively) connected to" or "accessed to" another component, for example, a second component, the component may be directly connected to the other component or may be connected through still another component, for example, a third component.

The term "module" used herein may include a unit configured as hardware, software, or firmware, and may be interchangeably used with the terms "logic," "logic block," "part," "circuit," etc. The module may be an integrally configured part, a minimum unit that performs at least function, or a portion thereof. For example, the module may be configured as an application-specific integrated circuit (ASIC).

According to the example embodiments, each of the components (e.g., module or program) may include a singular object or a plurality of objects. According to the example embodiments, at least one of the components or operations may be omitted. Alternatively, at least one another component or operation may be added. Alternatively or additionally, a plurality of components (e.g., module or program) may be integrated into a single component. In this case, the integrated component may perform one or more functions of each of the components in the same or similar manner as it is performed by a corresponding component before integration. According to the example embodiments, operations performed by a module, a program, or another component may be performed in sequential, parallel, iterative, or heuristic manner. Alternatively, at least one of the operations may be performed in different sequence or omitted. Alternatively, at least one another operation may be added.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed by Appstore that distributes applications or a site, a server, and the like that supplies and distributes other various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. An operating method of an electronic apparatus, the method comprising:
   segmenting a multimedia signal detected through an input into a plurality of frames;
   segmenting each of the frames into a plurality of blocks defined by a time axis and a frequency axis that intersects;
   representing each of the blocks as a hash word based on a time feature and a frequency feature for each of the blocks; and
   generating a fingerprint of the signal based on the hash words representing the blocks,
   wherein the representing each of the blocks as the hash word comprises detecting the hash word based on a combination of a first time direction on the time axis and a first frequency direction on the frequency axis and a combination of a second time direction on the time axis and a second frequency direction on the frequency axis.

2. The method of claim 1, wherein the time feature represents an energy distribution over time with respect to each of the blocks, and the frequency feature represents an energy distribution over frequency with respect to each of the blocks.

3. The method of claim 1, wherein the representing each of the blocks as the hash word further comprises:

detecting the hash word for each of the blocks based on a differential value calculated through the combination; and representing each of the blocks as the detected hash word.

4. The method of claim 3, wherein the detecting of the hash word comprises:

calculating a first differential value according to a first time direction of the time axis and a first frequency direction of the frequency axis;

calculating a second differential value according to a second time direction of the time axis and a second frequency direction of the frequency axis;

calculating a differential value by adding up the first differential value and the second differential value; and detecting the hash word based on the differential value.

5. The method of claim 4, wherein the detecting of the hash word further comprises calculating at least one of a third differential value and a fourth differential value, the calculating of the third differential value according to the first time direction and the second frequency direction, and the calculating the fourth differential value according to the second time direction and the first frequency direction.

6. The method of claim 5, wherein the calculating of the differential value further comprises calculating the differential value by adding up at least one of the third differential value and the fourth differential value with the first differential value and the second differential value.

7. The method of claim 4, wherein the detecting of the hash word based on the differential value comprises comparing the differential value and a threshold.

8. The method of claim 7, wherein the threshold is determined as a differential value in a previous frame among the plurality of frames.

9. The method of claim 7, wherein the detecting of the hash word comprises detecting the hash word as 1 if the differential value exceeds the threshold, and detecting the hash word as 0 if the differential value is less than or equal to the threshold.

10. An electronic apparatus comprising:

an input; and processing circuitry configured to segment a multimedia signal detected through the input into a plurality of frames, segment each of the frames into a plurality of blocks defined by a time axis and a frequency axis that intersects, and represent each of the blocks as a hash word based on a time feature and a frequency feature for each of the blocks, and generate a fingerprint of the signal based on the hash words representing the blocks, wherein the representing each of the blocks as the hash word comprises detecting the hash word based on a combination of a first time direction on the time axis and a first frequency direction on the frequency axis and a combination of a second time direction on the time axis and a second frequency direction on the frequency axis.

11. The electronic apparatus of claim 10, wherein the time feature represents an energy distribution over time with respect to each of the blocks, and the frequency feature represents an energy distribution over frequency with respect to each of the blocks.

12. The electronic apparatus of claim 10, wherein the processing circuitry is further configured to detect the hash word for each of the blocks based on a differential value according to the combination.

13. The electronic apparatus of claim 12, wherein the processing circuitry is further configured to calculate a first differential value according to a first time direction of the time axis and a first frequency direction of the frequency axis, calculate a second differential value according to a second time direction of the time axis and a second frequency direction of the frequency axis, calculate a differential value by adding up the first differential value and the second differential value, and detect the hash word based on the differential value.

14. The electronic apparatus of claim 13, wherein the processing circuitry is further configured to calculate at least one of a third differential value and a fourth differential value, the third differential value according to the first time direction and the second frequency direction and the fourth differential value according to the second time direction and the first frequency direction and calculate the differential value by adding up at least one of the third differential value and the fourth differential value with the first differential value and the second differential value.

15. The electronic apparatus of claim 13, wherein the processing circuitry is further configured to detect the hash word based on the differential value by comparing the differential value and a threshold.

16. The electronic apparatus of claim 15, wherein the threshold is determined as a differential value in a previous frame among the plurality of frames.

17. The electronic apparatus of claim 15, wherein the processing circuitry is further configured to detect the hash word as 1 if the differential value exceeds the threshold, and detect the hash word as 0 if the differential value is less than or equal to the threshold.

18. A non-transitory computer-readable storage medium storing instructions that, when executed by at least one processor, cause the at least one processor to perform an operating method of an electronic apparatus, the method comprising:

segmenting a multimedia signal detected from an input into a plurality of frames;

segmenting each of the frames into a plurality of blocks defined by a time axis and a frequency axis that intersects; and representing each of the blocks as a hash word based on a time feature and a frequency feature for each of the blocks; and generating a fingerprint of the signal based on the hash words representing the blocks, wherein the representing each of the blocks as the hash word comprises detecting the hash word based on a combination of a first time direction on the time axis and a first frequency direction on the frequency axis and a combination of a second time direction on the time axis and a second frequency direction on the frequency axis.

* * * * *